United States Patent
Park

(10) Patent No.: US 9,819,059 B2
(45) Date of Patent: Nov. 14, 2017

(54) BATTERY MODULE AND DRIVING METHOD THEREOF

(71) Applicant: SAMSUNG SDI CO., LTD., Yongin-si, Gyeonggi-do (KR)

(72) Inventor: Jin-Hyuk Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 126 days.

(21) Appl. No.: 14/737,365

(22) Filed: Jun. 11, 2015

(65) Prior Publication Data

US 2016/0156201 A1 Jun. 2, 2016

(30) Foreign Application Priority Data

Dec. 2, 2014 (KR) .................. 10-2014-0170501

(51) Int. Cl.
*H02J 7/00* (2006.01)
*H01M 10/42* (2006.01)

(52) U.S. Cl.
CPC .. *H01M 10/425* (2013.01); *H01M 2010/4271* (2013.01); *H01M 2200/103* (2013.01); *H02J 7/00* (2013.01)

(58) Field of Classification Search
USPC ........................................................ 320/106
See application file for complete search history.

(56) References Cited

U.S. PATENT DOCUMENTS

| | | | |
|---|---|---|---|
| 6,856,922 B1* | 2/2005 | Austin ................. | H02J 7/0073 320/132 |
| 2011/0304299 A1* | 12/2011 | Yang ..................... | H02J 7/045 320/107 |
| 2012/0126820 A1* | 5/2012 | Tan ....................... | H02J 7/0013 324/434 |
| 2012/0169284 A1* | 7/2012 | Park ...................... | H02J 7/045 320/112 |
| 2013/0113429 A1* | 5/2013 | Kim ....................... | H02J 7/00 320/128 |

FOREIGN PATENT DOCUMENTS

| KR | 10-2011-0138830 A | 12/2011 |
|---|---|---|
| KR | 10-2013-0104149 A | 9/2013 |

* cited by examiner

*Primary Examiner* — Samuel Berhanu
(74) *Attorney, Agent, or Firm* — Lewis Roca Rothgerber Christie LLP

(57) ABSTRACT

A battery modules includes: a battery having a positive electrode and a negative electrode; a first connection terminal including communication terminals, a first terminal, and a second terminal, the second terminal being electrically decoupled from the first terminal and connected to the negative electrode of the battery, and the communication terminals being for communicating with outside the battery module; and a battery management system (BMS) configured to control the battery, and including a first power terminal connected with the positive electrode of the battery, a second power terminal connected with the first terminal of the first connection terminal, and a data terminal connected with the communication terminals.

9 Claims, 5 Drawing Sheets

BATTERY MODULE AND DRIVING METHOD THEREOF

CROSS-REFERENCE TO RELATED APPLICATION

This application claims priority to and the benefit of Korean Patent Application No. 10-2014-0170501, filed on Dec. 2, 2014 in the Korean Intellectual Property Office, the entire content of which is incorporated herein by reference in its entirety.

BACKGROUND

1. Field

Aspects of embodiments of the present invention relate to a battery module and a driving method thereof.

2. Description of the Related Art

As environmental destruction and resource depletion become a problem, an interest in a system and/or device capable of storing power and efficiently utilizing the stored power has increased. Further, an interest in new types of regeneration energy, which does not cause pollution during power generation, has also increased. An energy storing system is a system for connecting regenerated energy, a battery for storing power, and an existing power system.

In the energy storing system, efficient management of the battery is one of the important factors. Various aspects of the battery should be managed, such as charge, discharge, and cell balancing. When the battery is efficiently managed, it may be possible to increase a lifespan of the battery and stably provide power to a load.

The battery is provided in a module form based on an intended implementation or use. However, when the battery is provided in the module form, power is unnecessarily consumed by a Battery Management System (BMS) included in the module.

SUMMARY

Aspects of embodiments of the present invention provide a battery module having reduced or minimized power consumption and a driving method thereof.

An exemplary embodiment of the present invention provides a battery module including: a battery having a positive electrode and a negative electrode; a first connection terminal including communication terminals, a first terminal, and a second terminal, the second terminal being electrically decoupled from the first terminal and connected to the negative electrode of the battery, and the communication terminals being for communicating with outside the battery module; and a battery management system (BMS) configured to control the battery, and including a first power terminal connected with the positive electrode of the battery, a second power terminal connected with the first terminal of the first connection terminal, and a data terminal connected with the communication terminals.

When the first connection terminal is connected with an external first connector, the first terminal and the second terminal may be electrically connected.

The first connector may include a third terminal and a fourth terminal, the third terminal may be connected with the first terminal, and the fourth terminal may be connected with the second terminal. The third terminal and the fourth terminal may be electrically connected.

The battery module may further include: a second connection terminal including a positive terminal for receiving a positive voltage from the battery and a negative terminal for receiving a negative voltage from the battery; and a fuse between the positive terminal and the positive electrode of the battery.

The battery module may further include a housing accommodating the battery, the BMS, and the fuse therein, and the housing may have recesses exposing the first connection terminal and the second terminal.

Another exemplary embodiment of the present invention provides a driving method of a battery module, the battery module includes: a battery; a battery management system (BMS) for controlling the battery; and a first connection terminal including communication terminals connected with a data terminal of the BMS, the driving method includes: blocking a power supply to the BMS when a first connector is not connected to the first connection terminal; and supplying power to the BMS when the first connector is connected to the first connection terminal.

When the first connector is connected to the first connection terminal, a first power terminal of the BMS may be connected to a positive electrode of the battery, and a second power terminal of the BMS may be connected to a negative electrode of the battery via the first connection terminal.

According to exemplary embodiments of the present invention, the battery module and the driving method of the battery module do not supply power to a BMS during a period in which the battery module is not operated (e.g., is not being used), thereby reducing or minimizing power consumption.

BRIEF DESCRIPTION OF THE DRAWINGS

Example embodiments of the present invention will now be described more fully hereinafter with reference to the accompanying drawings; however, the present invention may be embodied in many different forms and should not be construed as limited to the embodiments set forth herein. Rather, these embodiments are provided so that this disclosure will be thorough and complete and will fully convey the scope of the present invention to those skilled in the art.

In the figures, dimensions of the various elements, layers, etc. may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
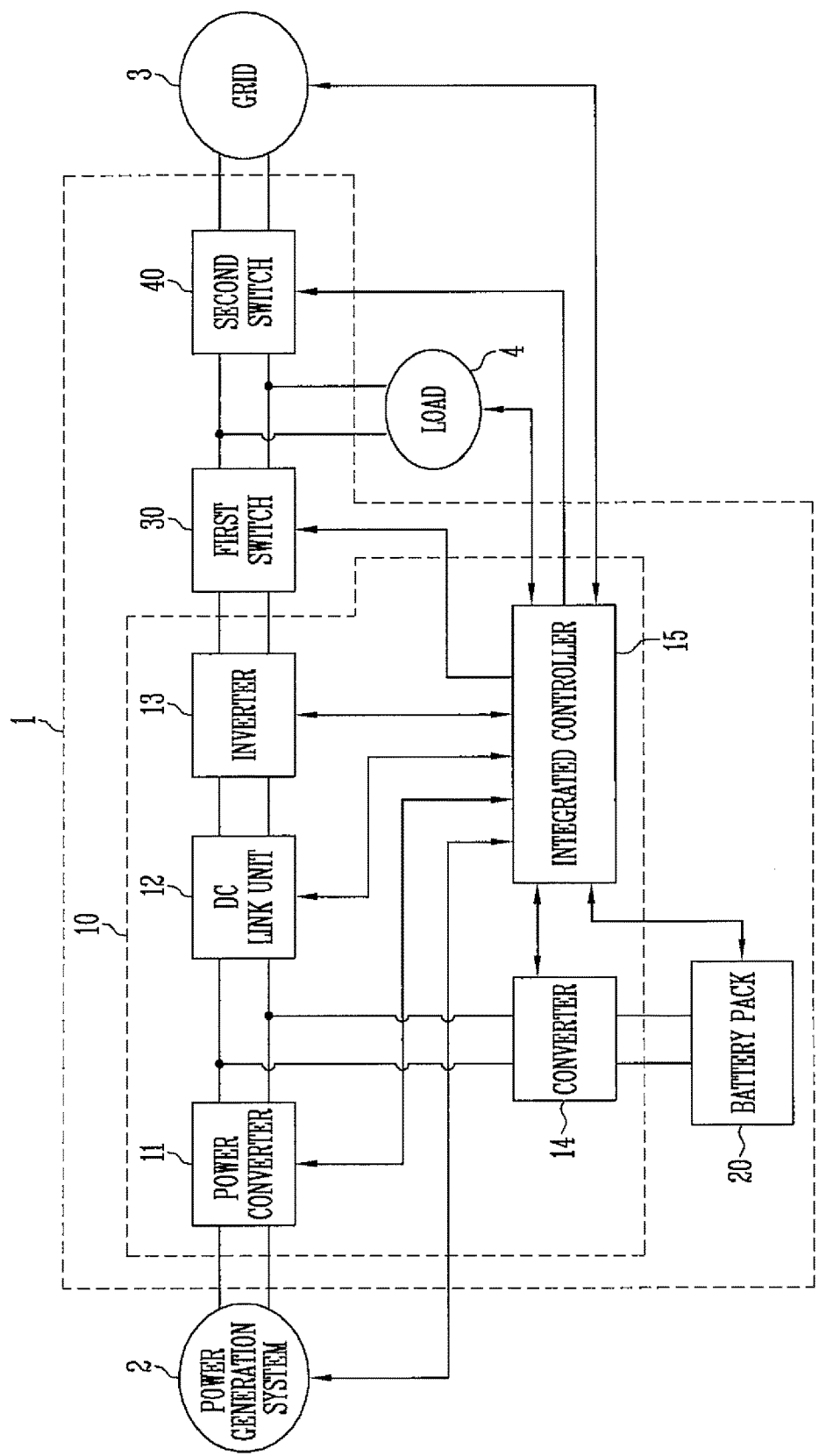
FIG. 1 is a diagram illustrating an energy storing system according to an exemplary embodiment of the present invention.

It will be understood that when an element or layer is referred to as being "on", "connected to", or "coupled to"

another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention". Expressions, such as "at least one of," when preceding a list of elements, modify the entire list of elements and do not modify the individual elements of the list. Also, the term "exemplary" is intended to refer to an example or illustration.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly. As used herein, the terms "use," "using," and "used" may be considered synonymous with the terms "utilize," "utilizing," and "utilized," respectively.

The terminology used herein is for the purpose of describing particular example embodiments only and is not intended to be limiting of example embodiments. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The battery management system (BMS) and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the devices described herein may be formed on one integrated circuit (IC) chip or on separate IC chips. Further, the various components of the BMS and/or other devices may be implemented on a flexible printed circuit film, a tape carrier package (TCP), a printed circuit board (PCB), or formed on a same substrate as the BMS and/or other devices. Further, the various components of the BMS and/or other devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Hereinafter, one or more exemplary embodiments of the present invention, which those skilled in the art may implement without undue experimentation, will be described with reference to accompanying FIGS. 1 to 5 in detail.

FIG. 1 is a diagram illustrating an energy storing system according to an exemplary embodiment of the present invention.

Referring to FIG. 1, an energy storing system 1 according to an exemplary embodiment of the present invention is connected with a power generation system 2 and a grid 3 to supply power to a load 4.

The power generation system 2 is a system for generating power by using an energy source. The power generation system 2 supplies generated power to the energy storing system 1. The power generation system 2 may be a sunlight power generation system (e.g., a solar power generation system), a wind power generation system, and/or a tidal power generation system. However, these examples are illustrative, and the power generation system 2 is not limited thereto. For example, the power generation system 2 may include any suitable power generation system for generating power, such as solar heat and geothermal heat. For example, it is easy to install a solar cell for generating electric energy by using sunlight in each house, factory, and the like, such that the solar cell may be suitably applied to the energy storing system 1.

The grid 3 is an electric grid including, for example, a power plant, a substation, a power cable, and/or the like. When the grid 3 is in a normal state, the grid 3 alternately supplies power to the energy storing system 1 to supply power to the load 4 and/or to a battery pack 20 and receives power from the energy storing system 1. When the grid 3 is in an abnormal state, power supply from the grid 3 to the energy storing system 1 is interrupted, and power supply from the energy storing system 1 to the grid 3 is also interrupted.

The load 4 consumes power generated in or by the power generation system 2, power stored in the battery pack 20, and/or power supplied from the grid 3. For example, a house, a factory, or the like may be the load 4.

The energy storing system 1 stores the power generated by the power generation system 2 in the battery pack 20 and supplies the generated power to the grid 3. Further, the energy storing system 1 may supply the power stored in the battery pack 20 to the grid 3 or store the power supplied from the grid 3 in the battery pack 20. To this end, the energy storing system 1 includes a Power Conversion System (PCS) 10 for controlling power conversion, the battery pack 20, a first switch 30, and/or a second switch 40.

The PCS 10 converts power from the power generation system 2, the grid 3, and/or the battery pack 20 into appropriate power (e.g., suitable power) and supplies the converted power to the load and/or to the power storage device (e.g., to a necessary point). To this end, the PCS 10 includes a power converter 11, a DC link unit 12, an inverter 13, a converter 14, and/or an integrated controller 15.

The power converter 11 is a power converting device located between the power generation system 2 and the DC link unit 12. The power converter 11 transfers power generated by the power generation system 2 to the DC link unit 12, and in this embodiment, an output voltage of the power generation system 2 is converted into a direct-current link voltage.

The power converter 11 may be (e.g., may be configured as) a power converting circuit, such as a converter and a rectifier circuit, according to the kind of power generation system 2. Further, when the generated power is a direct current, the power converter 11 may be a converter for converting a direct current into a direct current (i.e., a DC-to-DC converter). Further, when the generated power is an alternating current, the power converter 11 may be a current circuit for converting an alternating current into a direct current (i.e., a DC-to-AC converter). For example, when the power generation system 2 is a sunlight power generation system, the power converter 11 may include a Maximum Power Point Tracking (MPPT) converter for performing MPPT control so as to increase or maximize power generated by the power generation system 2 according to a change in the amount of solar radiation and a temperature.

The DC link unit 12 is connected between the power converter 11 and the inverter 13 to constantly maintain a direct current link voltage. For example, a large capacity capacitor and the like may be used as the DC link unit 12.

The inverter 13 is a power converting device connected between the DC link unit 12 and the first switch 30. During a discharge mode (e.g., a discharging state), the inverter 13 may convert a direct current link voltage output from the power generation system and/or the battery pack 20 into an alternating current voltage and output the converted voltage. Further, during a charging mode (e.g., a charging state), the inverter 13 may convert an alternating current voltage from the grid 3 into a direct current link voltage and output the converted voltage. The inverter 13 may include, for example, a filter for removing high frequency from the alternating current voltage, a Phase Locked Loop (PLL) circuit for phase synchronization, and/or the like.

The converter 14 is a power converting device (e.g., a DC-to-DC converter) connected between the DC link unit 12 and the battery pack 20. During the discharge mode, the converter 14 converts the power stored in the battery pack 20 into a direct current link voltage suitable for (e.g., demanded by) the inverter 13 and outputs the converted voltage. During the charge mode, the converter 14 converts a voltage of power output from the power converter 11 or the inverter 13 into a voltage (e.g., a charge voltage) storable in the battery pack 20 and outputs the converted voltage.

The integrated controller 15 monitors one or more states of the power generation system 2, the grid 3, the battery pack 20, the load 4, and the like and controls operations of the power converter 11, the DC link unit 12, the inverter 13, the converter 14, the battery pack 20, the first switch 30, and/or the second switch 40 according to a result of the monitoring and an algorithm (e.g., a predetermined algorithm).

The first switch 30 and the second switch 40 are connected (e.g., connected in series) between the inverter 13 and the grid 3 and control a current flow between the power generation system 2 and the grid 3 according to (e.g., under the control of) the integrated controller 15 by performing an on/off operation. On/off states of the first switch 30 and the second switch 40 may be determined according to the states of the power generation system 2, the grid 3, and/or the battery pack 20.

For example, when the power from the power generation system 2 and/or the battery pack 20 is supplied to the load 40 or the power from the grid 3 is supplied to the battery pack 20, the first switch 30 is set to the on-state. When the power from the power generation system 2 and/or the battery pack 20 is supplied to the grid 3 or the power of the grid 3 is supplied to the load 4 and/or the battery pack 20, the second switch 40 is set to the on-state. A switching device, such as a relay, being resistant to a relatively large current may be used as the first switch 30 and/or the second switch 40.

The battery pack 20 receives power from the power generation system 2 and/or the grid 3, stores the received power, and supplies the stored power to the load 4 and/or the grid 3. The battery pack 20 may include a battery tray as a subordinated constituent element thereof.

Figure 2:
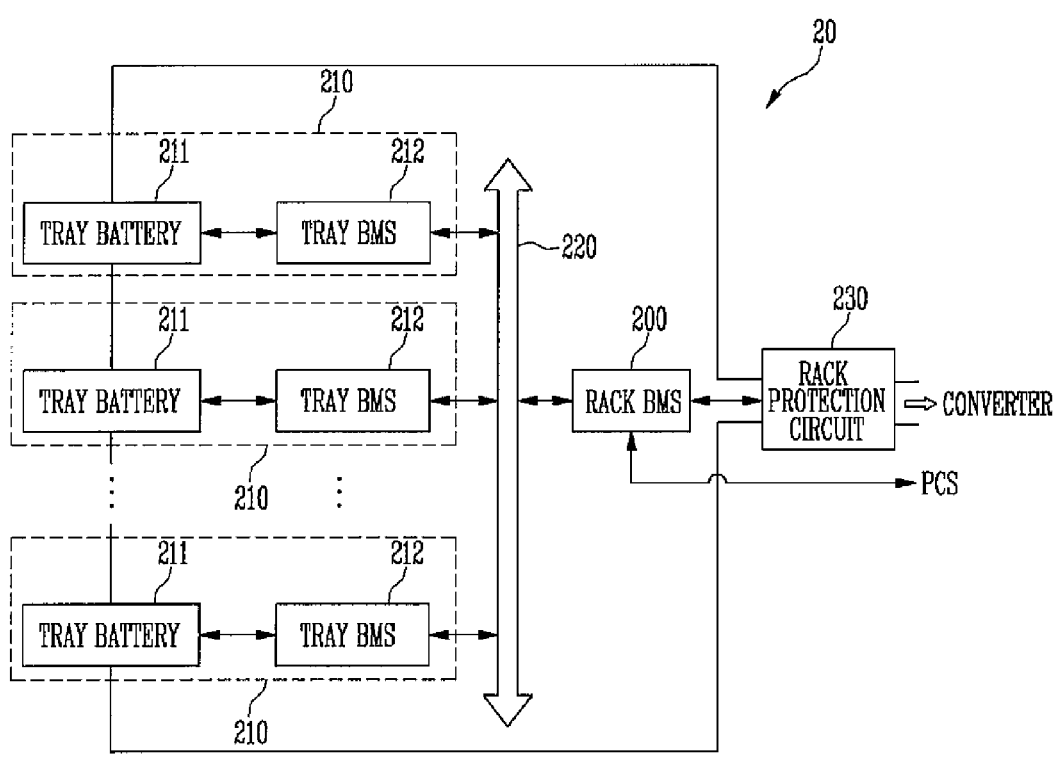
FIG. 2 is a diagram illustrating a configuration of a battery pack according to an exemplary embodiment of the present invention.

FIG. 2 is a diagram illustrating a configuration of the battery pack according to an exemplary embodiment of the present invention. The battery pack 20 may include a battery rack as an element thereof, and the battery rack may include a battery tray as a subordinated constituent element thereof.

Referring to FIG. 2, the battery pack 20 may include a rack BMS 200, a plurality of trays 210, a bus line 220, and a rack protection circuit 230. Each of the trays 210 may include a tray battery 211 and a tray BMS 212.

The rack BMS 200 controls charging and discharging operations of the battery pack 20 by controlling the rack protection circuit 230. Further, the rack BMS 200 monitors one or more states, for example, a temperature, a voltage, and/or a current, of the battery pack 20 and transmits a result of the monitoring to the PCS 10 (e.g., the integrated controller 15).

Further, the rack BMS 200 receives information about the tray battery 211 from the corresponding tray BMS 212 and controls the tray BMS 212 based on (e.g., according to) the received information. Further, the rack BMS 200 may transmit the information received from the tray BMS 212, or an analysis result obtained from the received information, to the PCS 10 and may transmit a control signal received from the PCS 10 to the tray BMS 212.

The plurality of trays 210 are subordinate elements of the battery rack, store power, and supply the stored power to the grid 3, the load 4, and the like.

The tray battery 211 is configured to store power and may include a battery cell as a subordinate element thereof. The number of battery cells included in each tray battery 211 may be determined according to a desired output voltage. A rechargeable secondary battery may be used as the battery cell. For example, a nickel-cadmium battery, a lead acid battery (e.g., a lead storage battery), a nickel metal hydride (NiMH) battery, a lithium ion battery, and/or a lithium polymer battery may be used as the battery cell.

The tray BMS 212 controls the corresponding tray battery 211. For example, the tray BMS 212 monitors one or more states, for example, a temperature, a voltage, and/or a current, of the tray battery 211. The information monitored by the tray BMS 212 is transmitted to the rack BMS 200.

The bus line 220 is a path through which data and/or commands are transmitted between the rack BMS 200 and the tray BMS 212. A Controller Area Network (CAN) communication network may be used as the bus line 220.

The rack protection circuit 230 may block the supply and/or input of power in response to (e.g., due to control of) the rack BMS 200. To this end, the rack protection circuit 230 may include a relay, a fuse, and the like.

In this exemplary embodiment of the present invention, it is described that the rack BMS 200 and the tray BMS 212 communicate by using the bus line 220, but the present invention is not limited thereto. For example, the rack BMS 200 may one-to-one communicate (e.g., may have separate communication connections) with each tray BMS 212.

In addition, in one or more embodiments of the present invention, each of the trays 210 may be configured as a battery module. When each of the trays 210 is configured as a battery module, the trays 210 may be separately stored, making it possible to easily add or remove one or more of the trays as necessary. Further, when each of the trays 210 is configured as a battery module, it is possible to reduce or minimize devices and/or components exposed to the outside (e.g., to the outside of the battery pack 20), thereby improving reliability.

Figure 3A:
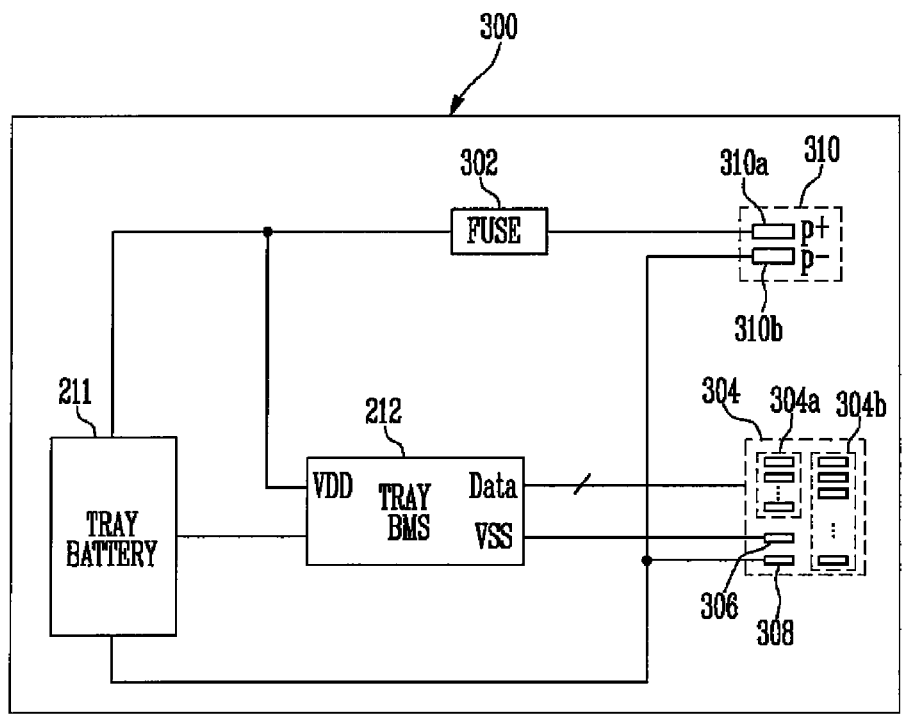
FIGS. 3A and 3B are diagrams illustrating a battery module according to an exemplary embodiment of the present invention.
Figure 3B:
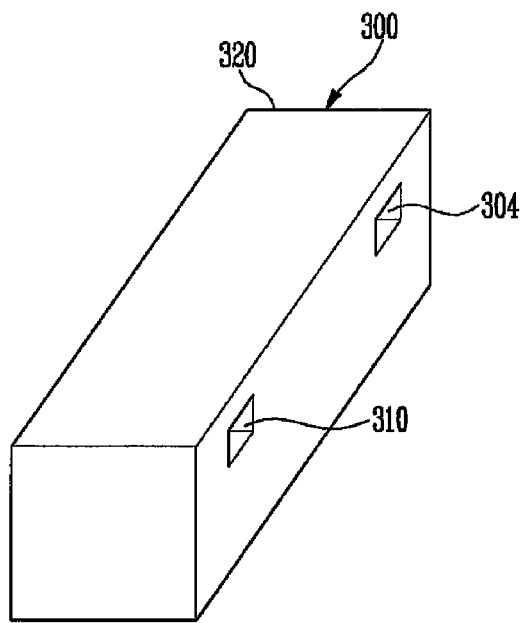

FIGS. 3A and 3B are diagrams illustrating a battery module according to an exemplary embodiment of the present invention.

Referring to FIGS. 3A and 3B, a battery module 300 according to an exemplary embodiment of the present invention includes the tray battery 211 (e.g., a battery), the tray BMS 212 (e.g., the BMS), a fuse 302, a first connection terminal 304, and a second connection terminal 310, each of which are included inside a housing 320.

The housing 320 may be formed to have a specific shape. For example, the housing 320 may be formed to have a rectangular parallelepiped shape as illustrated in the drawings, but the housing 302 is not limited thereto. For example, the housing 320 may have various shapes for easy storing, moving, and installation.

The tray battery 211 is configured for storing power and includes a plurality of cells (e.g., battery cells) connected in parallel or serial.

The tray BMS 212 controls the tray battery 211. For example, the tray BMS 212 monitors a temperature, a voltage, a current, and/or the like and supplies the monitored temperature, voltage, current, and/or the like to the rack BMS 200. The tray BMS 212 also performs a function, such as cell balancing control of the tray battery 211 in response to (e.g., due to the control of) the rack BMS 200.

The tray BMS 212 includes a first power terminal VDD receiving a positive voltage P+ from the tray battery 211, a second power terminal VSS connected with the first connection terminal 304, and a data terminal Data connected with the first connection terminal 304.

The first power terminal VDD receives the positive voltage P+ from the tray battery 211. The second power terminal VSS selectively receives a negative voltage P− from the tray battery 211 via the first connection terminal 304. In this embodiment, when the negative voltage P− is supplied to the tray BMS 212 via the first connection terminal 304, the tray BMS 212 sets (e.g., enters) a standby mode in which the tray BMS 212 is drivable. When the negative voltage P− is not supplied to the tray BMS 212, power supply (e.g., power supply from the tray battery 211) is blocked and the BMS 212 is set in (e.g., enters) a shutdown mode. The negative voltage P− is a voltage from a negative electrode of the tray battery 211 and may be set as a ground (e.g., a ground voltage).

The data terminal Data transceives (e.g., transmits and receives) data with a higher tray BMS (e.g., the rack BMS 200) and a subordinate tray BMS via the first connection terminal 304. For example, the tray BMS 212 may transmit information about the tray battery 211 to the rack BMS 200 via a higher tray BMS and receive control information from the rack BMS 200 via the higher tray BMS. To this end, a plurality of data terminals Data may be included.

The fuse 302 is positioned between the second connection terminal 310 and a positive electrode of the tray battery 211. When an overcurrent and the like is supplied (e.g., is supplied to the battery module 300), the fuse 302 blocks the positive electrode of the tray battery 211 and the second connection terminal 310 and protects the tray battery 211.

The second connection terminal 310 includes a positive terminal 310a and a negative terminal 310b. The positive terminal 310a receives the positive voltage P+ from the tray battery 211 via the fuse 302. The negative terminal 310 receives the negative voltage P− from the tray battery 211.

The second connection terminal 310 is electrically connected with a second connector including terminals corresponding to the positive terminal 310a and the negative terminal 310b. When the second connection terminal 310 is electrically connected with the second connector, a voltage of the tray battery 211 is supplied to the PCS 10 via the rack protection circuit 230 in response to (e.g., due to the control of) the tray BMS 212.

The first connection terminal 304 includes a first terminal 306, a second terminal 308, third terminals 304a, and fourth terminals 304b. In this embodiment, the third terminals 304a and the fourth terminals 304b are used as communication terminals.

The first terminal 306 is electrically connected with the second power terminal VSS of the tray BMS 212. The second terminal 308 is electrically connected with the negative electrode of the tray battery 211 and receives the negative voltage P− from the tray battery 211. In this embodiment, the first terminal 306 and the second terminal 308 are normally in (e.g., formed in) an electrically decoupled state. When the first terminal 306 and the second terminal 308 are electrically decoupled (e.g., when the tray battery 211 is in the shutdown mode), the negative voltage P− from the tray battery 211 is not supplied to the tray BMS 212 and, thus, power is not unnecessary consumed.

The first terminal 306 and the second terminal 308 are electrically connected when a first connector is connected to the first connection terminal 304. When the first terminal 306 and the second terminal 308 are electrically connected, the negative voltage P− is supplied to the tray BMS 212, and thus, the tray BMS 212 is set in a drivable state (e.g., the standby mode).

When the first connector is inserted (e.g., is connected to the first connection terminal 304), the third terminals 304a are electrically connected with a higher tray BMS or the rack BMS 200. When the first connector is inserted, the fourth terminals 304b are electrically connected with a subordinate tray BMS.

Figure 4A:
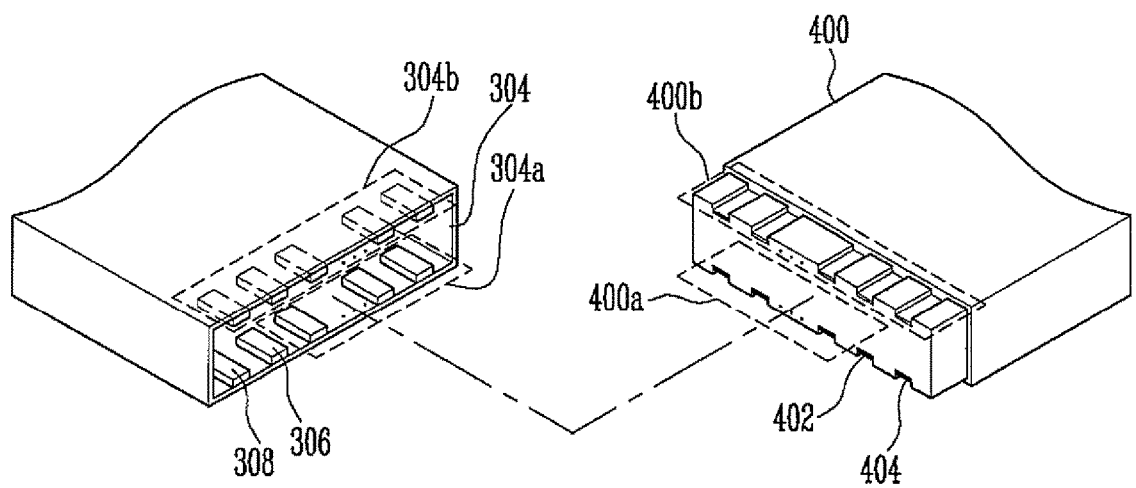
FIGS. 4A and 4B are diagrams illustrating a first connection terminal and a first connector according to an exemplary embodiment of the present invention.
Figure 4B:
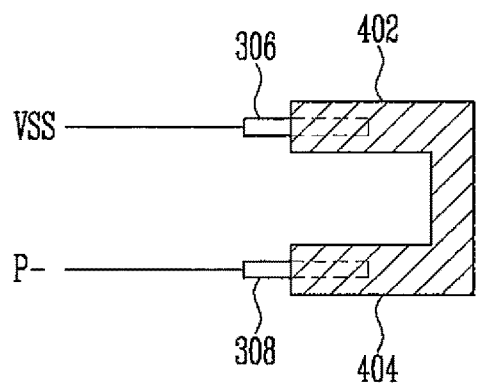

FIGS. 4A and 4B are diagrams illustrating an exemplary embodiment of the first connection terminal and the first connector. In FIGS. 4A and 4B, the first connection terminal and the first connector have specific shapes, but the present invention is not limited thereto. For example, the first connection terminal and the first connector of the present invention may have various suitable shapes so as to be electrically connected with each other.

Referring to FIGS. 4A and 4B, the first connection terminal 304 according to the exemplary embodiment of the present invention may have a recess shape so as to include the first terminal 306, the second terminal 308, the third terminals 304a, and the fourth terminals 304b in a recessed portion.

The first connector 400 includes a fifth terminal 402 electrically connected with the first terminal 306, a sixth terminal 404 electrically connected with the second terminal 308, seventh terminals 400a electrically connected with the third terminal 304a, and eighth terminals 400b electrically connected with the fourth terminals 304b. The first connector 400 may have a shape to be inserted into the first connection terminal 306.

The seventh terminals 400a, electrically connected with the third terminals 304a, are electrically connected with a higher tray BMS or the rack BMS 200. The eighth terminals 400b, electrically connected with the fourth terminals 304b, are electrically connected with a subordinate tray BMS.

The fifth terminal 402, connected with the first terminal 306, and the sixth terminal 404, connected with the second terminal 308, are normally in (e.g., formed in) an electrically connected state. That is, the fifth terminal 402 and the sixth terminal 404 are electrically connected, and thus, when the first connector 400 is inserted into the first connection terminal 304, the first terminal 306 and the second terminal 308 are electrically connected. When the first terminal 306 and the second terminal 308 are electrically connected, the tray BMS 212 is set in the standby mode in which the tray BMS 212 is drivable.

Figure 5:
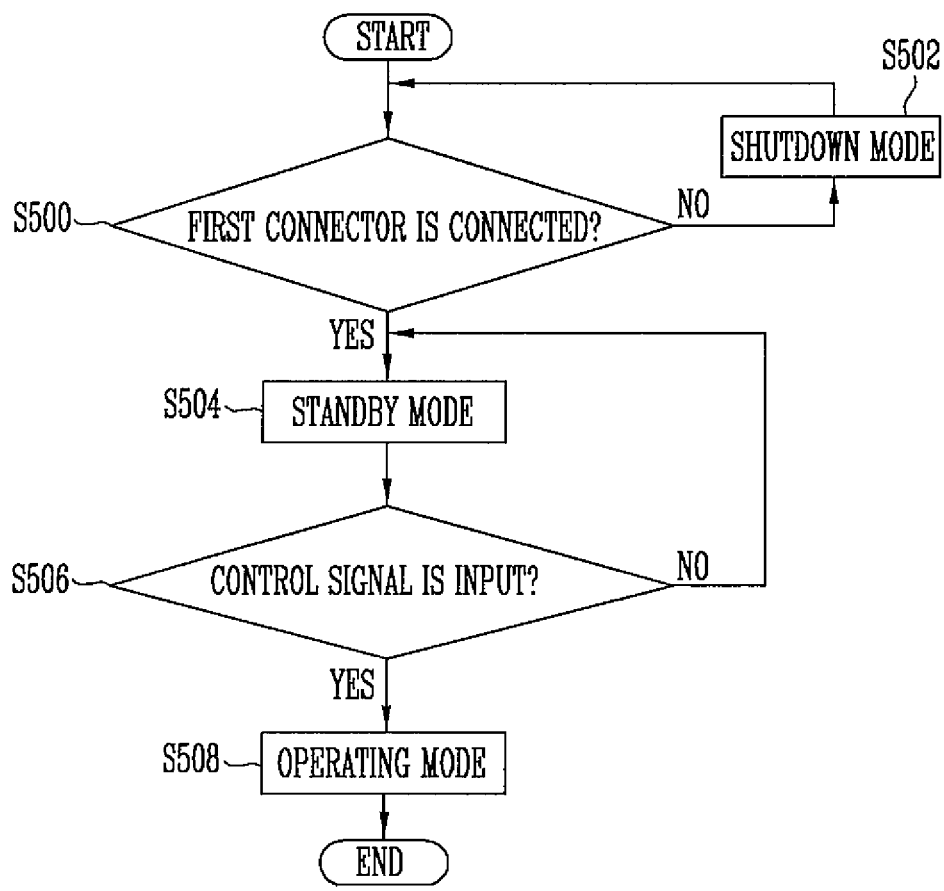
FIG. 5 is a flowchart illustrating a driving method of a battery module according to an exemplary embodiment of the present invention.

FIG. 5 is a flowchart illustrating a driving method of the battery module according to an exemplary embodiment of the present invention.

<Shutdown Mode: S500 and S502>

The battery module 300 includes each of the tray battery 211, the tray BMS 212, and the fuse 302 inside the housing 320. Further, the first connection terminal 304 and the second connection terminal 310 are formed in the housing 320 so as to be connectable with external connectors.

In this embodiment, when the first connection terminal 304 and the first connector 400 are not connected, the negative voltage P− is not supplied to the tray BMS 212. When the negative voltage P− is not supplied to the tray BMS 212, the battery module 300 is set to the shutdown mode.

In the shutdown mode, the battery module 300 is not used. In embodiments of the present invention, a voltage is not unnecessarily supplied to the tray BMS 212 during the shutdown period (e.g., in the shutdown mode) in which the battery module 300 is not used, and thus, it is possible to reduce or minimize power consumption. For example, when the negative voltage P− is supplied to the tray BMS 212 during the period in which the battery module 300 is not used, power corresponding to about 3 μA may be consumed.

<Standby Mode: S504>

When the first connection terminal 304 of the battery module 300 is connected to the first connector 400, the first terminal 306 and the second terminal 308 are electrically connected. When the first terminal 306 and the second terminal 308 are electrically connected, the negative voltage P− is supplied to the second power terminal VSS of the tray BMS 212. In this case, the tray BMS 212 receives a voltage necessary for driving and, thus, is set to the standby mode in which the tray BMS 212 is drivable. In this embodiment, the standby mode is (e.g., the standby mode means) a state in which the tray BMS 212 is drivable.

<Operating Mode: S506 and S508>

After the battery module 300 is set to the standby mode, a control signal is input to the data terminal Data via the first input terminal 304. In this embodiment, the control signal is supplied from the rack BMS 200 and is set by a signal instructing operation (e.g., a predetermined operation). The tray BMS 212 receiving the control signal performs a corresponding operation in response to the control signal. For example, the operating mode is (e.g., the operating mode means) a state in which the battery module 300 performs a specific operation.

As described above, in one or more exemplary embodiments of the present invention, power is not supplied to the tray BMS 212 during the period in which the battery module 300 is not used, and thus, it is possible to reduce or minimize power consumption. Further, in one or more exemplary embodiments of the present invention, when the first connector 400 is connected to the first connection terminal 304 in order to use the battery module 300, power is supplied (e.g., is automatically supplied) to the tray BMS 212 so that the tray BMS 212 is set to be in a drivable state.

Example embodiments of the present invention have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made to the present embodiments without departing from the spirit and scope of the present invention as set forth in the following claims and their equivalents.

What is claimed is:

1. A battery module comprising:
   a battery having a positive electrode and a negative electrode;
   a first connection terminal comprising communication terminals, a first terminal, and a second terminal, the second terminal being electrically decoupled from the first terminal and connected to the negative electrode of the battery, and the communication terminals being for communicating with outside the battery module; and
   a battery management system (BMS) configured to control the battery, and comprising a first power terminal connected with the positive electrode of the battery, a second power terminal connected with the first terminal of the first connection terminal, and a data terminal connected with the communication terminals,
   wherein the first connection terminal is arranged electrically between the battery and the BMS such that, when the first terminal and the second terminal of the first connection terminal are electrically connected, the second power terminal of the BMS is electrically connected with the negative electrode of the battery via the first connection terminal.

2. The battery module of claim 1, wherein, when the first connection terminal is connected with an external first connector, the first terminal and the second terminal are electrically connected.

3. The battery module of claim 2, wherein the external first connector comprises a third terminal and a fourth terminal,
wherein the third terminal is connected with the first terminal, and the fourth terminal is connected with the second terminal, and
wherein the third terminal and the fourth terminal are electrically connected.

4. The battery module of claim 1, further comprising:
a second connection terminal comprising a positive terminal for receiving a positive voltage from the battery;
a negative terminal for receiving a negative voltage from the battery; and
a fuse between the positive terminal and a positive electrode of the battery.

5. The battery module of claim 4, further comprising:
a housing accommodating the battery, the BMS, and the fuse therein, the housing having recesses exposing the first connection terminal and the second terminal.

6. A driving method of a battery module, the battery module comprising: a battery; a battery management system (BMS) for controlling the battery; and a first connection terminal comprising communication terminals connected with a data terminal of the BMS, the driving method comprising:
blocking a power supply to the BMS when an external first connector is not connected to the first connection terminal; and
supplying power to the BMS when the external first connector is connected to the first connection terminal,
wherein the first connection terminal is arranged electrically between the battery and the BMS such that, when a first terminal and a second terminal of the first connection terminal are electrically connected, a second power terminal of the BMS is electrically connected with a negative electrode of the battery via the first connection terminal.

7. The driving method of claim 6, wherein, when the external first connector is connected to the first connection terminal, a first power terminal of the BMS is connected to a positive electrode of the battery, and the second power terminal of the BMS is connected to the negative electrode of the battery via the first connection terminal.

8. A battery system comprising:
a battery having a positive electrode and a negative electrode;
a first connection terminal comprising communication terminals, a first terminal, and a second terminal;
a battery management system (BMS) configured to control the battery, and comprising a first power terminal connected with the positive electrode of the battery, a second power terminal connected with the first terminal of the first connection terminal, and a data terminal connected with the communication terminals of the first connection terminal; and
an external first connector configured to be releasably connected with the first connection terminal, and comprising a third terminal and a fourth terminal being electrically connected,
wherein, when the external first connector is connected with the first connection terminal, the first terminal and the second terminal of the first connection terminal are electrically connected via the third terminal and the fourth terminal of the external first connector and the second power terminal of the battery management system (BMS) is electrically connected with the negative electrode of the battery via the first through fourth terminals, and
wherein, when the external first connector is disconnected from the first connection terminal, the second terminal is electrically decoupled from the first terminal and the second power terminal of the battery management system (BMS) is electrically decoupled from the negative electrode of the battery.

9. The battery system of claim 8, further comprising:
a second connection terminal comprising a positive terminal for receiving a positive voltage from the battery;
a negative terminal for receiving a negative voltage from the battery; and
a fuse between the positive terminal and a positive electrode of the battery.

* * * * *